United States Patent
Kim et al.

(10) Patent No.: US 12,187,824 B2
(45) Date of Patent: Jan. 7, 2025

(54) POLYOLEFIN AND METHOD FOR PREPARING SAME

(71) Applicant: HANWHA SOLUTIONS CORPORATION, Seoul (KR)

(72) Inventors: Na Yeun Kim, Daejeon (KR); Sung Hae Jun, Suwon (KR); Eun Jung Heo, Daejeon (KR); Ji Sung Kim, Seoul (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 806 days.

(21) Appl. No.: 17/296,991

(22) PCT Filed: Sep. 17, 2019

(86) PCT No.: PCT/KR2019/012003
§ 371 (c)(1),
(2) Date: May 26, 2021

(87) PCT Pub. No.: WO2020/122371
PCT Pub. Date: Jun. 18, 2020

(65) Prior Publication Data
US 2021/0395412 A1    Dec. 23, 2021

(30) Foreign Application Priority Data
Dec. 11, 2018 (KR) .................. 10-2018-0158913

(51) Int. Cl.
*C08F 210/16* (2006.01)
*C08F 4/659* (2006.01)
*C08F 4/6592* (2006.01)

(52) U.S. Cl.
CPC ........ *C08F 210/16* (2013.01); *C08F 4/65912* (2013.01); *C08F 4/65927* (2013.01)

(58) Field of Classification Search
None
See application file for complete search history.

(56) References Cited

U.S. PATENT DOCUMENTS

| 5,451,649 | A | 9/1995 | Zenk |
| 5,770,664 | A | 6/1998 | Okumura |
| 11,384,108 | B2 * | 7/2022 | Piao ........................ C07F 17/00 |
| 2017/0114166 | A1 * | 4/2017 | Harada ................. C08F 210/16 |

FOREIGN PATENT DOCUMENTS

| CN | 1117975 | A | 3/1996 |
| CN | 106133006 | A | 11/2016 |
| CN | 111836836 | A | 10/2020 |
| EP | 0672675 | A1 | 9/1995 |
| EP | 1642913 | A1 | 4/2006 |
| EP | 3708592 | A1 | 9/2020 |
| JP | 7039723 | B2 | 3/2022 |
| KR | 1020060058670 | A | 5/2006 |
| KR | 20160121566 | A | 10/2016 |
| KR | 10-2019-0110848 | A | 10/2019 |
| WO | 2015147215 | A1 | 10/2015 |

OTHER PUBLICATIONS

Office Action issued by Korea Patent Office.
EE search report dated Aug. 3, 2022.
CN OA dated Oct. 9, 2022.
JP Office Action dated Jun. 7, 2022.
International Search report dated Jan. 7, 2020.
An office action issued on Jul. 20, 2023, for the corresponding EP Patent Application.

* cited by examiner

*Primary Examiner* — Catherine S Branch
(74) *Attorney, Agent, or Firm* — Harvest IP Law, LLP

(57) ABSTRACT

A polyolefin and a method for preparing same are provided. The polyolefin is formed by copolymerizing an olefin-based monomer and a comonomer in the presence of an olefin polymerization catalyst comprising a transition metal compound for an olefin polymerization catalyst represented by formula 1, and the weight average molecular weight (Mw) thereof may be 20,000 or less. The description of formula 1 is the same as that in the description of the invention.

8 Claims, No Drawings

POLYOLEFIN AND METHOD FOR PREPARING SAME

CROSS REFERENCE TO RELATED APPLICATIONS

This application is a National Stage of International Application No. PCT/KR2019/012003 filed Sep. 9, 2019, claiming priority based on Korean Patent Application No. 10-2018-0158913 filed on Dec. 11, 2018 in the Korean Intellectual Property Office, and all the benefits accruing therefrom under 35 U.S.C. 119, the contents of which in its entirety are herein incorporated by reference.

TECHNICAL FIELD

The present invention relates to a polyolefin and a method for preparing the same, and more specifically, to a polyolefin having low molecular weight and low viscosity characteristics and a method for preparing the same.

BACKGROUND ART

A metallocene catalyst, which is one of the catalysts used to polymerize olefins, is a compound, in which a ligand, such as a cyclopentadienyl group, an indenyl group, and a cycloheptadienyl group, is coordinate bonded to a transition metal or a transition metal halogen compound, and has a sandwich structure in its basic form.

The metallocene catalyst is a single-site catalyst including the metallocene compound and a cocatalyst such as methylaluminoxane, and a polymer polymerized by the metallocene catalyst has a narrow molecular weight distribution, a uniform comonomer distribution, and a copolymerization activity higher than that of the Ziegler-Natta catalyst.

However, since there are still many difficulties in commercial use, there is a need for a manufacturing technique based on the development of a catalyst with high stability even at high temperatures or excellent reactivity with olefins and economic feasibility.

DISCLOSURE

Technical Problem

A problem to be solved by the present invention is to provide a transition metal compound for an olefin polymerization catalyst, an olefin polymerization catalyst comprising the same and having high stability even at high temperatures and excellent reactivity with olefins, and a polyolefin polymerized using the same and having excellent properties such as a low molecular weight and low viscosity.

The problems of the present invention are not limited to the aforementioned technical problems, and other technical problems, which have not been mentioned, may be clearly understood by a person with ordinary skill in the art from the following description.

Technical Solution

A polyolefin according to an exemplary embodiment for solving the above problem is formed by copolymerizing an olefin-based monomer and a comonomer in the presence of an olefin polymerization catalyst comprising a transition metal compound for an olefin polymerization catalyst represented by Formula 1, and the weight average molecular weight (Mw) thereof may be 20,000 or less.

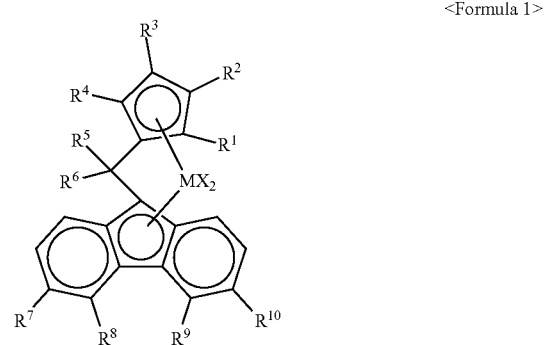

<Formula 1>

(In Formula 1, M is titanium (Ti), zirconium (Zr) or hafnium (Hf), X is each independently a halogen, a $C_{1-20}$ alkyl, a $C_{2-20}$ alkenyl, a $C_{2-20}$ alkynyl, a $C_{6-20}$ aryl, a $C_{1-20}$ alkyl $C_{6-20}$ aryl, a $C_{6-20}$ aryl $C_{1-20}$ alkyl, a $C_{1-20}$ alkylamido, a $C_{6-20}$ arylamido or a $C_{1-20}$ alkylidene, $R^1$ to $R^4$ are each independently hydrogen, a $C_{1-20}$ alkyl, a $C_{2-20}$ alkenyl, a $C_{2-20}$ alkynyl, a $C_{6-20}$ aryl, a $C_{1-20}$ alkyl $C_{6-20}$ aryl, a $C_{6-20}$ aryl $C_{1-20}$ alkyl, a $C_{1-20}$ alkylamido, a $C_{6-20}$ arylamido or $C_{1-20}$ alkylidene, $R^5$ and $R^6$ are each independently a $C_{1-20}$ alkyl, a $C_{2-20}$ alkenyl, a $C_{2-20}$ alkynyl, a $C_{6-20}$ aryl, a $C_{1-20}$ alkyl $C_{6-20}$ aryl, a $C_{6-20}$ aryl $C_{1-20}$ alkyl, a $C_{1-20}$ alkylamido, a $C_{6-20}$ arylamido or a $C_{1-20}$ alkylidene, or linked to each other to form a substituted or unsubstituted $C_{4-20}$ ring, and two adjacent ones of $R^7$ to $R^{10}$ are linked to each other to form a substituted or unsubstituted $C_{4-20}$ ring)

The polyolefin may have a viscosity ranging from 5000 cP to 10000 cP, as measured at 177° C.

The polyolefin may have a number average molecular weight (Mn) of 10,000 or less, and a molecular weight distribution (MWD) ranging from 2 to 3, as defined by the following Mathematical Formula 1.

$$Mw/Mn \qquad \text{[Mathematical Formula 1]}$$

The olefin-based monomer may be ethylene, and the comonomer may be 1-octene.

X is each independently a halogen or a $C_{1-20}$ alkyl, $R^1$, $R^3$, and $R^4$ are each hydrogen, $R^2$ is a $C_{1-20}$ alkyl, $R^5$ and $R^6$ are each independently a $C_{1-20}$ alkyl or a $C_{6-20}$ aryl, or are linked to each other to form a substituted or unsubstituted aliphatic $C_{4-20}$ ring, and two adjacent ones of $R^7$ to $R^{10}$ may be linked to each other to form a substituted or unsubstituted aromatic $C_{5-20}$ ring.

$R^5$ and $R^6$ are each independently methyl, or may be linked to each other to form an aliphatic $C_4$ ring.

Two adjacent ones of $R^7$ to $R^{10}$ may be linked to each other to form a substituted or unsubstituted aromatic $C_6$.

Formula 1 may be at least any one of the following Formulae 1-1 to 1-12.
<Formula 1-1>
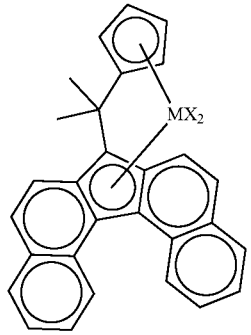
<Formula 1-2>
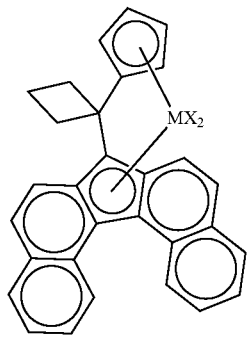
<Formula 1-3>
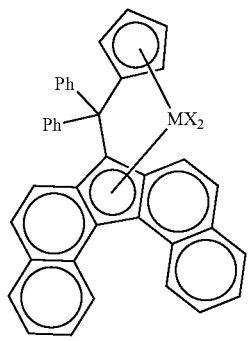
<Formula 1-4>
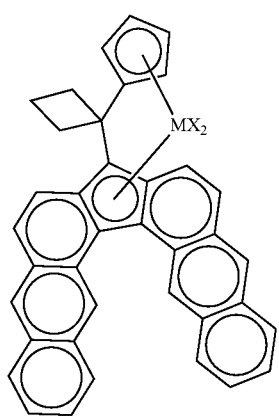
<Formula 1-5>
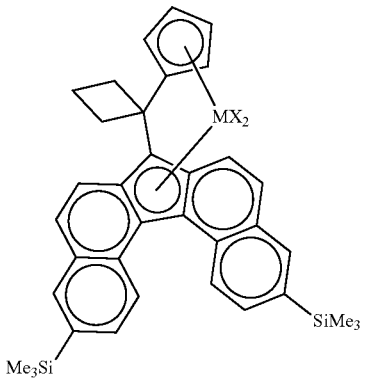
<Formula 1-6>
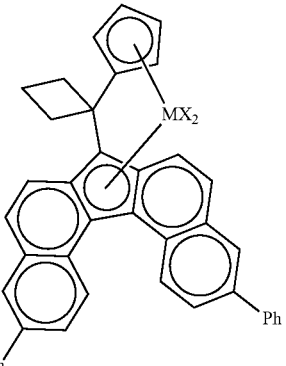
<Formula 1-7>
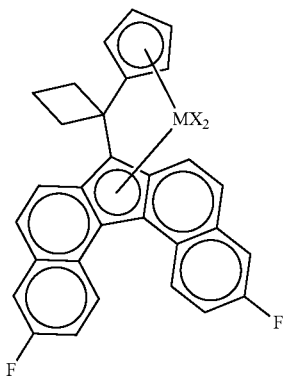
<Formula 1-8>
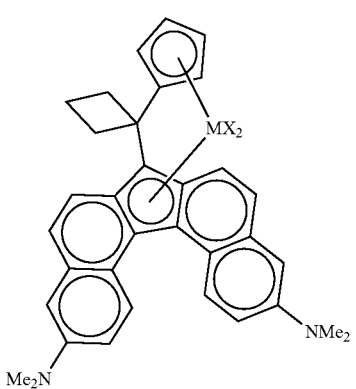

<Formula 1-9>

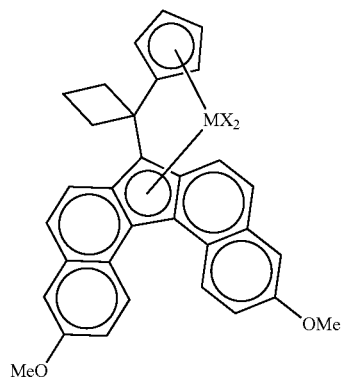

<Formula 1-10>

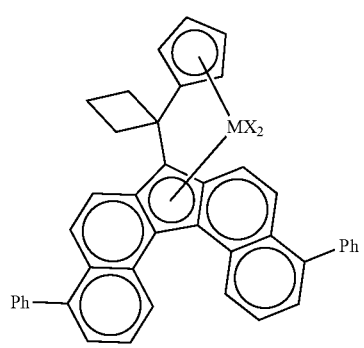

<Formula 1-11>

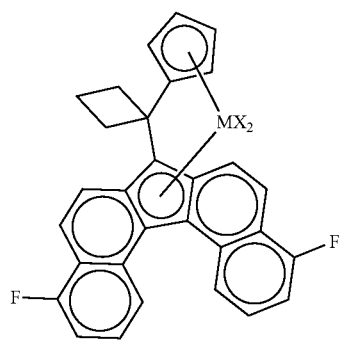

<Formula 1-12>

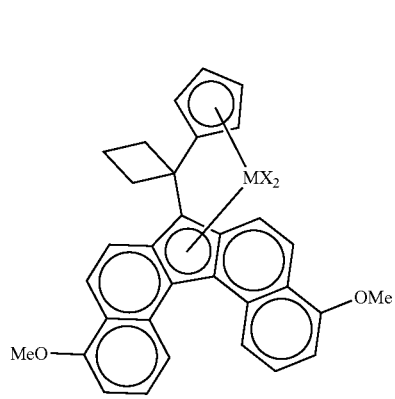

(In Formulae 1-1 to 1-12, M is zirconium or hafnium, and X is each independently a halogen or a $C_{1-20}$ alkyl)

Formula 1 may be at least any one of the following Formulae A to D.

<Formula A>

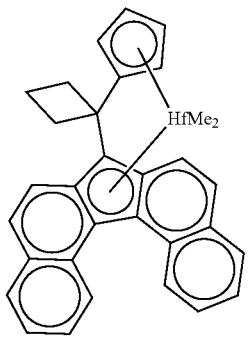

<Formula B>

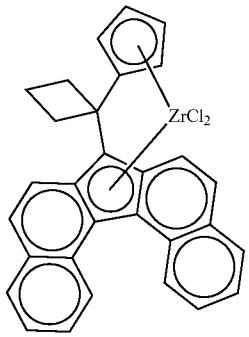

<Formula C>

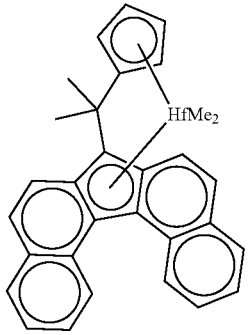

<Formula D>

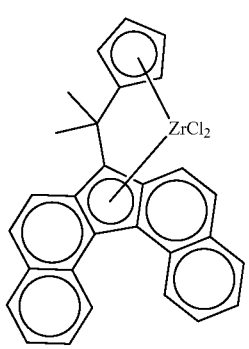

A method for preparing a polyolefin according to an exemplary embodiment for solving the above problem may include forming a polyolefin by polymerizing an olefin-based monomer and a comonomer in the presence of an olefin polymerization catalyst comprising a transition metal compound represented by the following Formula 1.

<Formula 1>

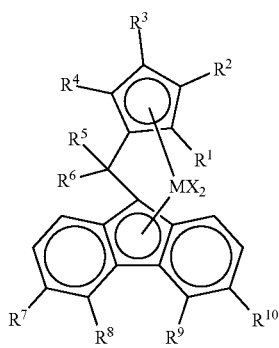

(In Formula 1, M is titanium (Ti), zirconium (Zr) or hafnium (Hf), X is each independently a halogen, a $C_{1-20}$ alkyl, a $C_{2-20}$ alkenyl, a $C_{2-20}$ alkynyl, a $C_{6-20}$ aryl, a $C_{1-20}$ alkyl $C_{6-20}$ aryl, a $C_{6-20}$ aryl $C_{1-20}$ alkyl, a $C_{1-20}$ alkylamido, a $C_{6-20}$ arylamido or a $C_{1-20}$ alkylidene, $R^1$ to $R^4$ are each independently hydrogen, a $C_{1-20}$ alkyl, a $C_{2-20}$ alkenyl, a $C_{2-20}$ alkynyl, a $C_{6-20}$ aryl, a $C_{1-20}$ alkyl $C_{6-20}$ aryl, a $C_{6-20}$ aryl $C_{1-20}$ alkyl, a $C_{1-20}$ alkylamido, a $C_{6-20}$ arylamido or $C_{1-20}$ alkylidene, $R^5$ and $R^6$ are each independently a $C_{1-20}$ alkyl, a $C_{2-20}$ alkenyl, a $C_{2-20}$ alkynyl, a $C_{6-20}$ aryl, a $C_{1-20}$ alkyl $C_{6-20}$ aryl, a $C_{6-20}$ aryl $C_{1-20}$ alkyl, a $C_{1-20}$ alkylamido, a $C_{6-20}$ arylamido or a $C_{1-20}$ alkylidene, or linked to each other to form a substituted or unsubstituted $C_{4-20}$ ring, and two adjacent ones of $R^7$ to $R^{10}$ are linked to each other to form a substituted or unsubstituted $C_{4-20}$ ring)

Formula 1 may be at least any one of the following Formulae 1-1 to 1-12.

<Formula 1-1>

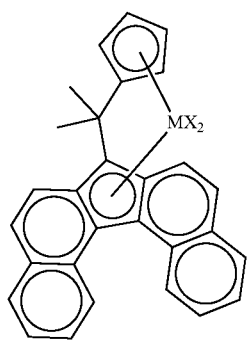

<Formula 1-2>

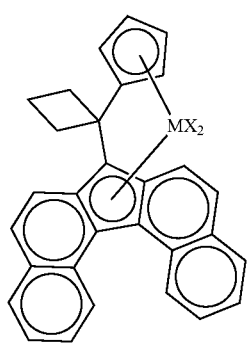

<Formula 1-3>

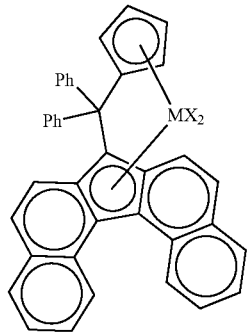

<Formula 1-4>

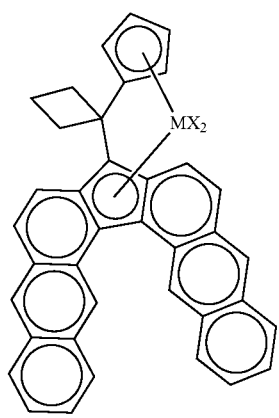

<Formula 1-5>

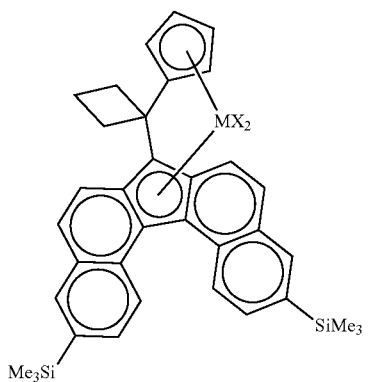

<Formula 1-6>

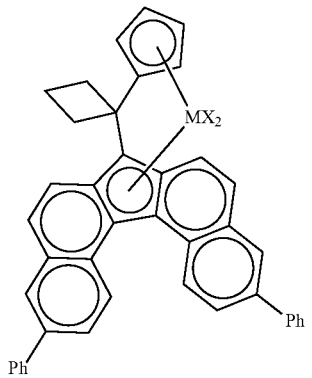

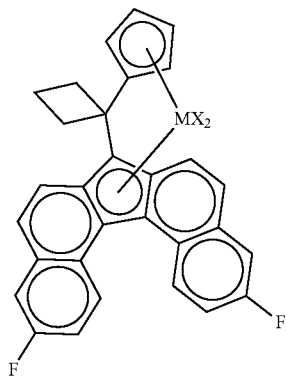
<Formula 1-7>
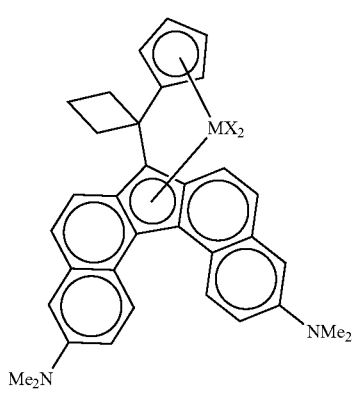
<Formula 1-8>
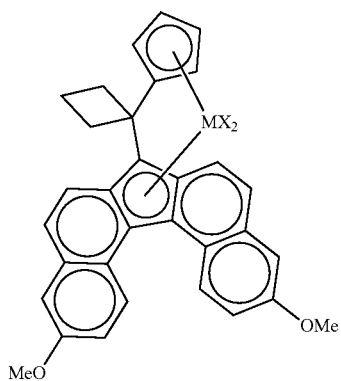
<Formula 1-9>
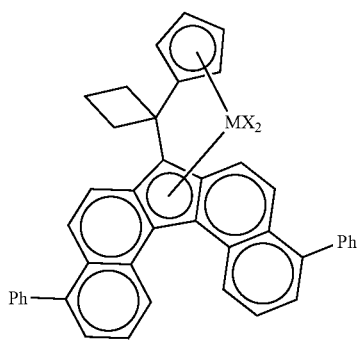
<Formula 1-10>
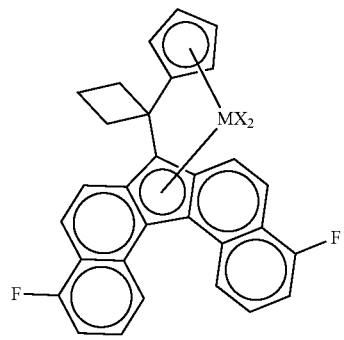
<Formula 1-11>
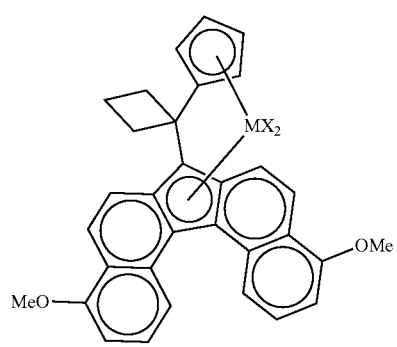
<Formula 1-12>
(In Formulae 1-1 to 1-12, M is zirconium or hafnium, and X is each independently a halogen or a $C_{1-20}$ alkyl)
Formula 1 may be at least any one of the following Formulae A to D.
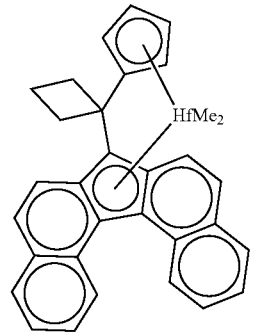
<Formula A>
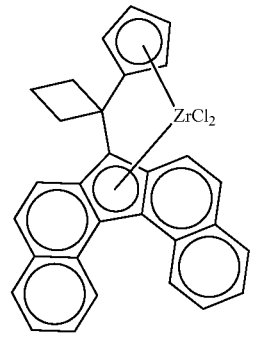
<Formula B>

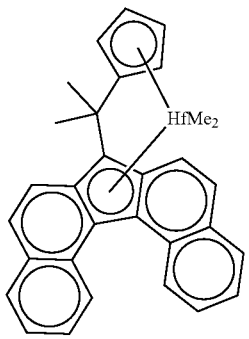

<Formula C>

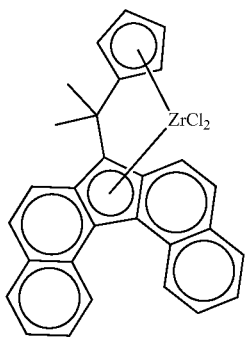

<Formula D>

The olefin polymerization catalyst may have a catalytic activity ranging from 160 kg-PE/g-Cat to 200 kg-PE/g-Cat.

The polyolefin may have a weight average molecular weight (Mw) of 20,000 or less.

The polyolefin may have a viscosity ranging from 5000 cP to 10000 cP, as measured at 177° C.

The polyolefin may have a number average molecular weight (Mn) of 10,000 or less, and a molecular weight distribution (MWD) ranging from 2 to 3, as defined by the following Mathematical Formula 1.

$Mw/Mn$ [Mathematical Formula 1]

The olefin-based monomer may be ethylene, and the comonomer may be 1-octene.

The olefin polymerization catalyst may further include a cocatalyst compound.

The cocatalyst compound may include at least any one of a compound represented by the following Formula I, a compound represented by the following Formula II and a compound represented by Formula III.

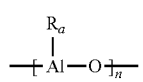

<Formula I>

(In Formula A, n is an integer of 2 or higher, and $R_a$ is a halogen atom, a $C_{1-20}$ hydrocarbon group or a $C_{1-20}$ hydrocarbon group substituted with a halogen)

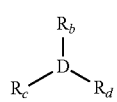

<Formula II>

(In Formula B, D is aluminum (Al) or boron (B), and $R_b$, $R_c$ and $R_d$ are each independently a halogen atom, a $C_{1-20}$ hydrocarbon group, a $C_{1-20}$ hydrocarbon group substituted with a halogen or a $C_{1-20}$ alkoxy group)

$[L-H]^+[Z(A)_4]^-$ or $[L]^+[Z(A)_4]^-$ <Formula III>

(In Formula C, L is a neutral or cationic Lewis base, $[L-H]^+$ and $[L]^+$ are Brönsted acids, Z is a Group 13 element, and A is each independently a substituted or unsubstituted $C_{6-20}$ aryl group or a substituted or unsubstituted $C_{1-20}$ alkyl group)

Specific details of other embodiments are included in the detailed description and drawings.

Advantageous Effects

A polyolefin polymerized using an olefin polymerization catalyst including a transition metal compound of the present invention to have high stability even at high temperatures and react with olefins can have excellent properties such as low molecular weight and low viscosity.

Further, the olefin polymerization catalyst including the transition metal compound of the present invention has a high synthesis rate and can be easily produced by an economical method, so that the olefin polymerization catalyst is excellent in commercial practicality.

The effects according to the embodiments of the present invention are not limited to the contents exemplified above, and more various effects are included in the present specification.

MODES OF THE INVENTION

The benefits and features of the present application, and the methods of achieving the benefits and features will become apparent with reference to embodiments to be described below in detail along with the accompanying drawings. However, the present invention is not limited to the embodiments to be disclosed below and may be implemented in various other forms, and the present embodiments are only provided for rendering the disclosure of the present invention complete and for fully representing the scope of the invention to a person with ordinary skill in the technical field to which the present invention pertains, and the present invention will be defined only by the scope of the claims.

As used herein, the term "$C_{A-B}$" means "the number of carbon atoms is A or more and B or less", the term "A to B" means "A or more and B or less", and in the term "substituted or unsubstituted", "substituted" means "at least one hydrogen of a hydrocarbon compound or hydrocarbon derivative is substituted with a halogen, a $C_{1-20}$ alkyl, a $C_{2-20}$ alkenyl, a $C_{2-20}$ alkynyl, a $C_{6-20}$ aryl, a $C_{1-20}$ alkyl $C_{6-20}$ aryl, a $C_{6-20}$ aryl $C_{1-20}$ alkyl, a $C_{1-20}$ alkylamido, a $C_{6-20}$ arylamido or a $C_{1-20}$ alkylidene", and "unsubstituted" means "at least one hydrogen of a hydrocarbon compound or hydrocarbon derivative is not substituted with a halogen, a $C_{1-20}$ alkyl, a $C_{2-20}$ alkenyl, a $C_{2-20}$ alkynyl, a $C_{6-20}$ aryl, a $C_{1-20}$ alkyl $C_{6-20}$ aryl, a $C_{6-20}$ aryl $C_{1-20}$ alkyl, a $C_{1-20}$ alkylamido, a $C_{6-20}$ arylamido or a $C_{1-20}$ alkylidene".

A polyolefin according to an exemplary embodiment of the present invention may be formed by copolymerizing an olefin-based monomer and a comonomer.

The polyolefin may be a homopolymer or copolymer polymerized by polymerization reactions such as, for example, free radical, cationic, coordination, condensation, and addition, but is not limited thereto.

In exemplary embodiments, the polyolefin may be prepared by a gas phase polymerization method, a solution polymerization method, a slurry polymerization method, or the like. When the polyolefin is prepared by a solution polymerization method or a slurry polymerization method, examples of a solvent which can be used include a $C_{5-12}$ aliphatic hydrocarbon solvent such as pentane, hexane, heptane, nonane, decane and an isomer thereof an aromatic hydrocarbon solvent such as toluene and benzene; a hydrocarbon solvent substituted with a chlorine atoms, such as dichloromethane and chlorobenzene; a mixture thereof, and the like, but are not limited thereto.

The olefin-based monomer may be one or more selected from the group consisting of a $C_{2-20}$ α-olefin, a $C_{1-20}$ diolefin, a $C_{3-20}$ cyclo-olefin and a $C_{3-20}$ cyclodiolefin.

In exemplary embodiments, the polyolefin-based monomer may be ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, and the like, and the polyolefin may be a homopolymer including only one of the exemplified olefin-based monomers, or a copolymer including two or more thereof.

Preferably, the polyolefin may be a copolymer in which ethylene and 1-octene are copolymerized, but is not limited thereto.

The polyolefin according to an exemplary embodiment of the present invention may have a weight average molecular weight (Mw) of 20,000 or less.

The polyolefin is polymerized in the presence of a catalyst including a transition metal compound for an olefin polymerization catalyst to be described below, and thus has low molecular weight and low viscosity characteristics compared to the same olefin-based polymer. The transition metal compound has high catalytic activity for the olefin-based monomer, and can polymerize a low-molecular weight polyolefin even when a relatively small amount of hydrogen ($H_2$) is injected. The polyolefin according to an exemplary embodiment of the present invention exhibits low viscosity characteristics by having a low molecular weight, and accordingly, the polyolefin may be used as a raw material for waxes and adhesives.

According to an exemplary embodiment of the present invention, the polyolefin may have a viscosity ranging from 5000 cP to 10000 cP, as measured at 177° C. Details on this will be described below with reference to Experimental Examples.

Further, according to an exemplary embodiment, the polyolefin may have a number average molecular weight (Mn) of 10,000 or less, and a molecular weight distribution (MWD) ranging from 2 to 3, as defined by the following Mathematical Formula 1.

$$MWD=Mw/Mn$$ [Mathematical Formula 1]

Meanwhile, as described above, the polyolefin of the present invention may be formed by polymerizing an olefin-based monomer in the presence of an olefin polymerization catalyst.

The polyolefin according to an exemplary embodiment of the present invention may be polymerized in the presence of an olefin polymerization catalyst including a transition metal compound for an olefin polymerization catalyst represented by the following Formula 1.

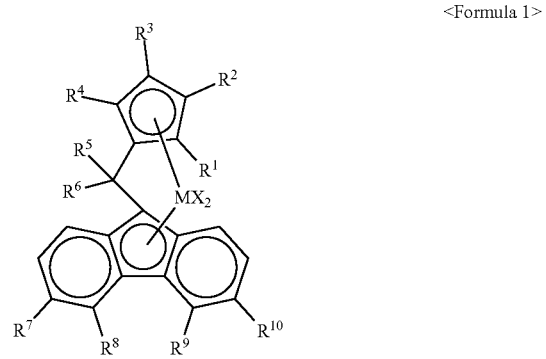

<Formula 1>

In Formula 1, M may be titanium (Ti), zirconium (Zr) or hafnium (Hf). Specifically, M may be zirconium or hafnium.

X may each be independently a halogen, a $C_{1-20}$ alkyl, a $C_{2-20}$ alkenyl, a $C_{2-20}$ alkynyl, a $C_{6-20}$ aryl, a $C_{1-20}$ alkyl $C_{6-20}$ aryl, a $C_{6-20}$ aryl $C_{1-20}$ alkyl, a $C_{1-20}$ alkylamido, a $C_{6-20}$ arylamido or a $C_{1-20}$ alkylidene. Specifically, X may each be independently a halogen or a $C_{1-20}$ alkyl. More specifically, X may each be independently chlorine (Cl) or methyl.

$R^1$ to $R^4$ may each be independently hydrogen, a $C_{1-20}$ alkyl, a $C_{2-20}$ alkenyl, a $C_{2-20}$ alkynyl, a $C_{6-20}$ aryl, a $C_{1-20}$ alkyl $C_{6-20}$ aryl, a $C_{6-20}$ aryl $C_{1-20}$ alkyl, a $C_{1-20}$ alkylamido, a $C_{6-20}$ arylamido or a $C_{1-20}$ alkylidene. Specifically, $R^1$, $R^3$ and $R^4$ are each hydrogen, and $R^2$ may be a $C_{1-20}$ alkyl. More specifically, $R^1$, $R^3$ and $R^4$ are each hydrogen, and $R^2$ may be n-butyl.

$R^5$ and $R^6$ are each independently a $C_{1-20}$ alkyl, a $C_{2-20}$ alkenyl, a $C_{2-20}$ alkynyl, a $C_{6-20}$ aryl, a $C_{1-20}$ alkyl $C_{6-20}$ aryl, a $C_{6-20}$ aryl $C_{1-20}$ alkyl, a $C_{1-20}$ alkylamido, a $C_{6-20}$ arylamido or a $C_{1-20}$ alkylidene, or may be linked to each other to form a substituted or unsubstituted $C_{4-20}$ ring. Specifically, $R^5$ and $R^6$ are each independently a $C_{1-20}$ alkyl or a $C_{6-20}$ aryl, or may be linked to each other to form a substituted or unsubstituted aliphatic $C_{4-20}$ ring. More specifically, $R^5$ and $R^6$ are each independently methyl, or may be linked to each other to form an aliphatic $C_4$ ring.

Two adjacent ones of $R^7$ to $R^{10}$ may be linked to each other to form a substituted or unsubstituted $C_{4-20}$ ring. Specifically, two adjacent ones of $R^7$ to $R^{10}$ may be linked to each other to form a substituted or unsubstituted aromatic $C_{5-20}$ ring. More specifically, two adjacent ones of $R^7$ to $R^{10}$ may be linked to each other to form a substituted or unsubstituted aromatic $C_6$ ring. Two adjacent ones of $R^7$ to $R^{10}$ may refer to $R^7$ and $R^8$ or $R^9$ and $R^{10}$.

The aromatic $C_6$ ring may be substituted with one or more of a halogen, a $C_{6-20}$ aryl, a $C_{1-20}$ alkylsilyl, a $C_{1-20}$ alkyloxy and a $C_{1-20}$ alkylamino. Specifically, the halogen may be fluorine (F), the $C_{6-20}$ aryl may be phenyl, the $C_{1-20}$ alkylsilyl may be trimethylsilyl (—$SiMe_3$), the $C_{1-20}$ alkyloxy may be methyloxy[methoxy] (—OMe), and the $C_{1-20}$ alkylamino may be dimethylamino (—$NMe_2$).

The transition metal compound may be represented by at least one of the following Formulae 1-1 to 1-12.

<Formula 1-1>
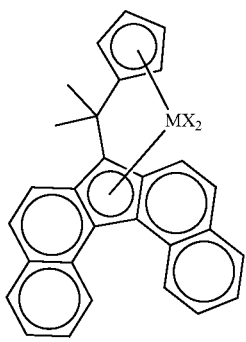
<Formula 1-2>
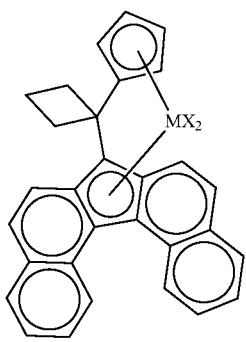
<Formula 1-3>
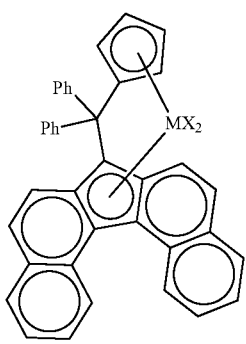
<Formula 1-4>
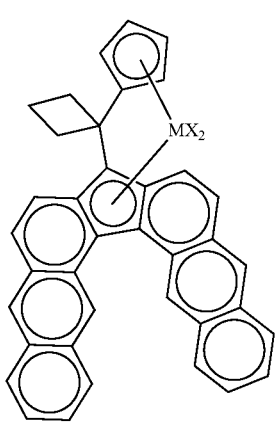
<Formula 1-5>
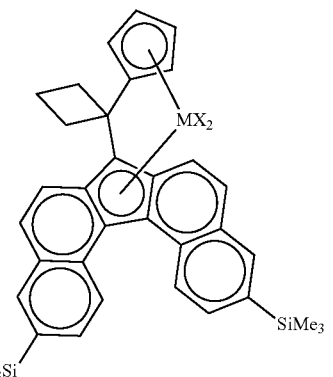
<Formula 1-6>
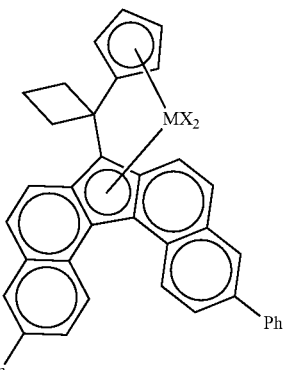
<Formula 1-7>
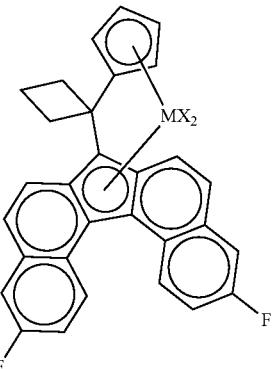
<Formula 1-8>
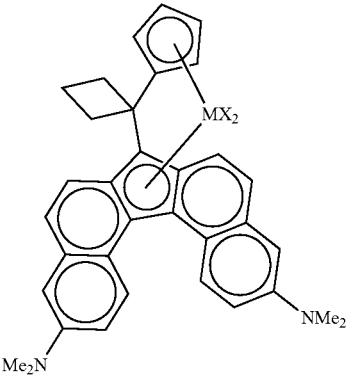

<Formula 1-9>

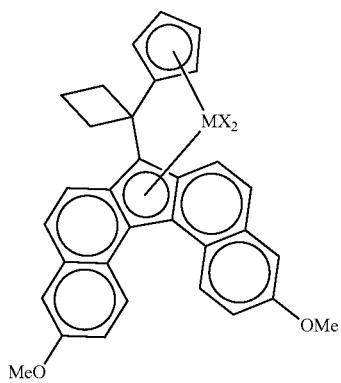

<Formula 1-10>

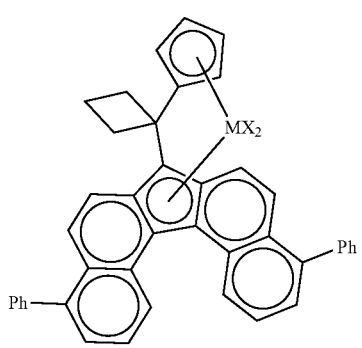

<Formula 1-11>

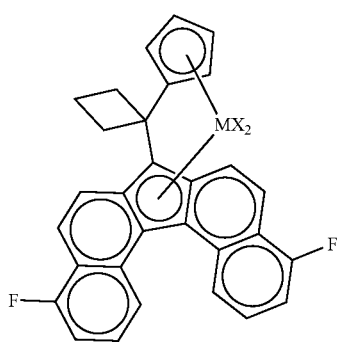

<Formula 1-12>

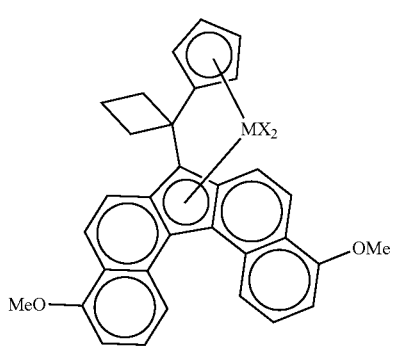

In Formulae 1-1 to 1-12, M may be zirconium or hafnium, and X may each be independently a halogen or a $C_{1-20}$ alkyl.

In exemplary embodiments, the transition metal compound may be any one or more of the following Formulae A to D.

<Formula A>

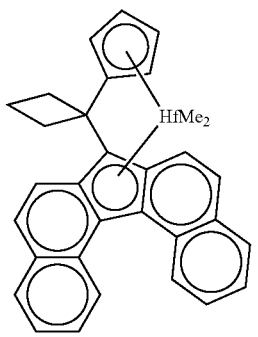

<Formula B>

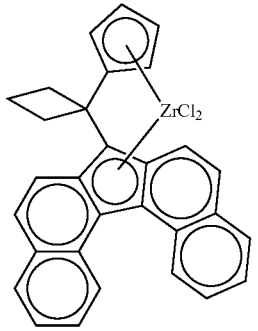

<Formula C>

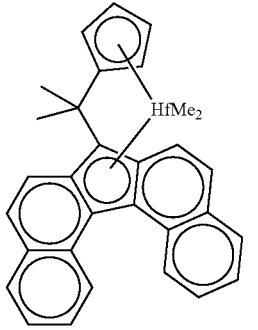

<Formula D>

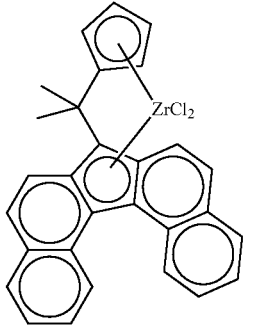

Preferably, the transition metal compound may be a compound of Formula A. Formula A includes hafnium (Hf) as a central metal, so that an olefin polymerization catalyst for polymerizing a polyolefin including Formula A may have characteristics which are excellent in the adjustment of a molecular weight of a polyolefin and copolymerizability. Further, when a bridge substituent between cyclopentadiene groups in the transition compound of Formula A is a cyclobutyl group, the activity performance and polymerization performance of the olefin polymerization catalyst are excellent compared to the case where the bridge substituent is an alkyl.

Meanwhile, the olefin polymerization catalyst for polymerizing a polyolefin may include one or more of the exemplified transition metal compounds and a cocatalyst compound.

The cocatalyst compound may include one or more of a compound represented by the following Formula I, a compound represented by the following Formula II and a compound represented by Formula III.

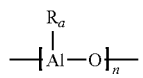

<Formula I>

In Formula I, n may an integer of 2 or higher, and $R_a$ is a halogen atom, a $C_{1-20}$ hydrocarbon group or a $C_{1-20}$ hydrocarbon group substituted with a halogen. Specifically, $R_a$ may be methyl, ethyl, n-butyl or isobutyl, but is not limited thereto.

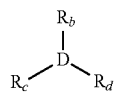

<Formula II>

In Formula II, D may be aluminum (Al) or boron (B), and Rb, Rc and Rd may each be independently a halogen atom, a $C_{1-20}$ hydrocarbon group, a $C_{1-20}$ hydrocarbon group substituted with a halogen or a $C_{1-20}$ alkoxy group. Specifically, when D is aluminum, Rb, Rc and Rd may each be independently methyl or isobutyl, and when D is boron, Rb, Rc and Rd may each be independently pentafluorophenyl, but are not limited thereto.

[L-H]⁺[Z(A)₄]⁻ or [L]⁺[Z(A)₄]⁻     <Formula III>

In Formula III, L may be a neutral or cationic Lewis base, [L-H]⁺ or [L]⁺ may be a Brönsted acid, Z may be a Group 13 element, and A may each be independently a substituted or unsubstituted $C_{6-20}$ aryl group or a substituted or unsubstituted $C_{1-20}$ alkyl group. Specifically, the [L-H]⁺ may be a dimethylanilinium cation, the [Z(A)₄]⁻ may be [B(C₆F₅)₄]⁻, and the [L]⁺ may be [(C₆H₅)₃C]⁺, but are not limited thereto.

The olefin polymerization catalyst may further include a carrier.

The carrier is not particularly limited as long as it can support a transition metal compound for an olefin polymerization catalyst and a cocatalyst compound. In exemplary embodiments, the carrier may be carbon, silica, alumina, zeolite, magnesium chloride, and the like.

As a method of supporting a transition metal compound for an olefin polymerization catalyst and a cocatalyst compound on a carrier, a physical adsorption method or a chemical adsorption method may be used.

In exemplary embodiments, the physical adsorption method may be a method of bringing a solution in which a transition metal compound for an olefin polymerization catalyst is dissolved into contact with a carrier, and then drying the carrier, a method of bringing a solution in which a transition metal compound for an olefin polymerization catalyst and a cocatalyst compound are dissolved into contact with a carrier, and then drying the carrier, a method of preparing a carrier on which a transition metal compound for an olefin polymerization catalyst is supported by bringing a solution in which a transition metal compound for an olefin polymerization catalyst is dissolved into contact with a carrier, and then drying the carrier, separately preparing a catalyst on which a cocatalyst compound is supported by bringing a solution in which a cocatalyst compound is dissolved into contact with a carrier, and then drying the carrier, and then mixing the carriers, or the like.

In exemplary embodiments, the chemical adsorption method may be a method of first supporting a cocatalyst compound on the surface of a carrier, and then supporting a transition metal compound for an olefin polymerization catalyst on the cocatalyst compound, a method of covalently bonding a catalyst compound with a functional group (for example, in the case of silica, a hydroxy group (—OH) on the surface of a carrier, or like.

A total supported amount of the main catalyst compound including a transition metal compound may be 0.001 mmol to 1 mmol based on 1 g of a carrier, and the supported amount of the cocatalyst compound may be 2 mmol to 15 mmol based on 1 g of the carrier.

However, such carriers need not be essentially included, and whether or not they can be used can be appropriately selected, if necessary.

Since the olefin polymerization catalyst including the transition metal compound of the present invention has stability at high temperatures and excellent reactivity with an olefin, particularly, an α-olefin, the olefin is easily polymerized, thus the catalyst has high catalytic activity and it is possible to prepare a polyolefin having low molecular weight and low viscosity characteristics.

This may be caused by the improvement in (co)polymerization reactivity of the olefin due to the relative abundance of electrons, particularly, in the case of the transition metal compound of the present invention in which two adjacent ones of $R^7$ to $R^{10}$ are linked to each other to form a substituted or unsubstituted aromatic $C_6$ ring, but is not limited thereto.

Hereinafter, specific preparation examples for the compounds represented by Formulae A to D among the transition metal compounds for an olefin polymerization catalyst of the present invention will be described.

<Preparation Example 1> Preparation of Compound of Formula A

Preparation Example 1-1: Preparation of 1,1'-binaphthyl-2,2'-dicarboxylic Acid

After t-BuLi (15.8 g, 41.1 mmol, 1.7 M in pentane) was added to a solution in which 2,2'-dibromo-1,1'-binaphthyl (3.85 g, 9.34 mmol) was diluted in THF (40 mL) at −78° C., the resulting solution was stirred for 1 hour. After a CO₂ gas was injected into the solution at −78° C. for 3 minutes, the temperature was slowly increased to room temperature, and the resulting solution was stirred for 12 hours. After the reaction was terminated by adding 10% HCl thereto at 0° C., the THF was removed under vacuum. An organic layer was separated by performing extraction with ethyl acetate, and recrystallized with chloroform to obtain 3.49 g (quant.) of 2,2'-dibromo-1,1'-binaphthyl which is a white solid compound having a 1H-NMR spectrum as follows.

1H-NMR (DMSO-d6, 300 MHz): δ 12.4 (s, 2H), 8.11-8.00 (m, 6H), 7.54 (t, 2H), 7.27 (t, 2H), 6.87 (d, 2H).

Preparation Example 1-2: Preparation of 7H-dibenzo[c,g]fluoren-7-one 1,1'-binaphthyl-2,2'-dicarboxylic acid (3.02 g, 8.82 mmol) prepared in Preparation Example 1-1 and acetic anhydride (30 mL) were mixed, and the resulting mixture was stirred at 140° C. for 1 and a half hours. After the acetic anhydride was removed under vacuum, the remaining solution was stirred at 300° C. for 3 hours. After the solution was filtered with dichloromethane, the residue was subjected to column chromatography (hexane:dichloromethane=1:1, v/v) to obtain 1.17 g (47%) of 7H-dibenzo[c,g]fluoren-7-one which is a red solid compound having a 1H-NMR spectrum as follows.

1H-NMR (CDCl3, 300 MHz): δ 8.37-8.33 (m, 2H), 7.92-7.87 (m, 2H), 7.83 (d, 2H), 7.77 (d, 2H), 7.60-7.55 (m, 4H).

Preparation Example 1-3: Preparation of 7H-dibenzo[c,g]fluorene

A solution in which 7H-dibenzo[c,g]fluoren-7-one (641 mg, 2.29 mmol) prepared in Preparation Example 1-2, $N_2H_4 \cdot H_2O$ (2.86 g, 57.2 mmol) and KOH (385 mg, 6.86 mmol) were dispersed in diethylene glycol (30 mL) was stirred at 170° C. for 3 hours. After the reaction was terminated by adding 10% HCl thereto at 0° C., the resulting solid was filtered. The solid was dried under vacuum to obtain 603 mg (99%) of 7H-dibenzo[c,g]fluorene which is a dark brown solid compound having a 1H-NMR spectrum as follows.

1H-NMR (CDCl3, 300 MHz): δ 8.73 (d, 2H), 7.97 (d, 2H), 7.86 (d, 2H), 7.73 (d, 2H), 7.59-7.48 (m, 4H), 4.13 (s, 2H).

Preparation Example 1-4: Preparation of (7H-dibenzo[c,g]fluorene) Lithium

After n-BuLi (980 mg, 2.30 mmol, 1.6 M in hexane) was slowly added to a solution in which 7H-dibenzo[c,g]fluorene (585 mg, 2.20 mmol) prepared in Preparation Example 1-3 was diluted in diethyl ether (50 mL) at −30° C., the temperature was slowly increased to room temperature, and the resulting solution was stirred for 12 hours. The resulting solid was filtered, and then dried under vacuum to obtain 598 mg (100%) of (7H-dibenzo[c,g]fluorene) lithium, which is a light brownish yellow solid compound.

Preparation Example 1-5: Preparation of 9-[1-(2,4-cyclopentadien-1-yl)-1-cyclobutyl]-7H-dibenzo[c,g]fluorene After a solution in which 5-cyclobutylidene-1,3-cyclopentadiene (518 mg, 4.38 mmol) was diluted in diethyl ether (10 mL) was slowly added to a solution in which (7H-dibenzo[c,g]fluorene) lithium (596 mg, 2.19 mmol) prepared in Preparation Example 1-4 was dispersed in diethyl ether (35 mL) at −30° C., the temperature was slowly increased to room temperature, and the resulting solution was stirred for 3 days. After the reaction was terminated, an organic layer was separated by performing extraction with diethyl ether and aqueous $NH_4Cl$. The organic layer was recrystallized with hexane to obtain 654 mg (78%) of 9-[1-(2,4-cyclopentadien-1-yl)-1-cyclobutyl]-7H-dibenzo[c,g] fluorene which is a white solid compound having a 1H-NMR spectrum as follows.

1H-NMR (CDCl3, 300 MHz): δ 8.56-8.47 (m, 2H), 7.95-7.89 (m, 2H), 7.79-7.76 (m, 4H), 7.50-7.44 (m, 4H), 5.96-5.81 (m, 1H), 5.74-5.67 (m, 1H), 5.59-5.50 (m, 1H), 4.42 (d, 1H), 2.99-2.79 (m, 2H), 2.58-2.44 (m, 2H), 2.39-2.02 (m, 2H), 2.01-1.94 (m, 2H).

Preparation Example 1-6: Preparation of cyclobutylidene [(cyclopentadienyl)-(7H-dibenzo[c,g]fluorenyl)] dilithium After n-BuLi (741 mg, 1.74 mmol, 1.6 M in Hexane) was slowly added to a solution in which 9-[1-(2,4-cyclopentadien-1-yl)-1-cyclobutyl]-7H-dibenzo[c,g] fluorene (319 mg, 0.83 mmol) prepared in Preparation Example 1-5 was diluted in diethyl ether (35 mL) at −30° C., the temperature was slowly increased to room temperature, and the resulting solution was stirred for 12 hours. The resulting solid was filtered, and then dried under vacuum to obtain 368 mg (quant., ether adduct) of cyclobutylidene [(cyclopentadienyl)-(7H-dibenzo[c,g]fluorenyl)] dilithium which is a light brownish yellow solid compound.

Preparation Example 1-7: Preparation of Cyclobutylidene [(cyclopentadienyl)-(7H-dibenzo[c,g]fluorenyl)] hafnium Dichloride After a solution in which $HfCl_4$ (277 mg, 0.86 mmol) was diluted in toluene (5 mL) was slowly added to a solution in which cyclobutylidene [(cyclopentadienyl)-(7H-dibenzo[c,g]fluorenyl)] dilithium (342 mg, 0.86 mmol) prepared in Preparation Example 1-6 was dispersed in toluene (40 mL) at −30° C., the temperature was slowly increased to room temperature, and the resulting solution was stirred for 12 hours. After the reaction was terminated, the resulting product was extracted with toluene and filtered. After the toluene was removed under vacuum, the residue was washed with hexane to obtain 335 mg (61%) of cyclobutylidene [(cyclopentadienyl)-(7H-dibenzo[c,g]fluorenyl)] hafnium dichloride which is a yellow solid compound having a 1H-NMR spectrum as follows.

1H-NMR (C6D6, 300 MHz): δ 9.10 (d, 2H), 7.69 (d, 2H), 7.39-7.24 (m, 8H), 6.02 (t, 2H), 5.44 (t, 2H), 2.90-2.77 (m, 2H), 2.58 (t, 2H), 2.26-2.14 (m, 1H), 1.88-1.74 (m, 1H).

Preparation Example 1-8: Preparation of cyclobutylidene [(cyclopentadienyl)-(7H-dibenzo[c,g]fluorenyl)] hafnium Dimethyl After a solution in which MeMgBr (448 mg, 1.30 mmol, 3.0 M in diethyl ether) was diluted in toluene (5 mL) was slowly added to a solution in which cyclobutylidene [(cyclopentadienyl)-(7H-dibenzo[c,g]fluorenyl)] hafnium dichloride (273 mg, 0.43 mmol) prepared in Preparation Example 1-7 was dispersed in toluene (20 mL) at −30° C., the resulting solution was stirred under reflux at 70° C. for 4 hours. After the reaction was terminated, the resulting product was extracted with toluene and filtered. After the toluene was removed under vacuum, the residue was washed with hexane to obtain 182 mg (71%) of cyclobutylidene [(cyclopentadienyl)-(7H-dibenzo[c,g]fluorenyl)] hafnium dichloride (a compound of the following Formula A) which is a yellow solid compound having a 1H-NMR spectrum as follows.

1H-NMR (C6D6, 300 MHz): δ 9.22 (d, 2H), 7.73 (d, 2H), 7.46-7.22 (m, 8H), 6.03 (t, 2H), 5.40 (t, 2H), 2.90-2.80 (m, 2H), 2.68-2.58 (m, 2H), 2.34-2.18 (m, 1H), 1.92-1.84 (m, 1H), −1.37 (s, 6H).

<Formula A>

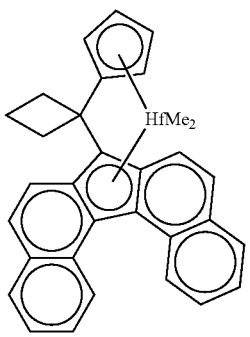

<Preparation Example 2> Preparation of Compound B of Formula B

Preparation Example 2-1: Preparation of cyclobutylidene [(cyclopentadienyl)-(7H-dibenzo[c,g]fluorenyl)] zirconium Dichloride After a solution in which $ZrCl_4$ (74 mg, 0.32 mmol) was diluted in toluene (3 mL) was slowly added to a solution in which cyclobutylidene [(cyclopentadienyl)-(7H-dibenzo[c,g]fluorenyl)] dilithium (127 mg, 0.32 mmol) prepared in Preparation Example 1-6 was dispersed in toluene (10 mL) at −30° C., the temperature was slowly increased to room temperature, and the resulting solution was stirred for 12 hours. After the reaction was terminated, the resulting product was extracted with toluene and filtered. After the toluene was removed under vacuum, the residue was washed with hexane to obtain 128 mg (74%) of cyclobutylidene [(cyclopentadienyl)-(7H-dibenzo[c,g]fluorenyl)] zirconium dichloride (a compound of the following Formula B) which is an orange solid compound having a 1H-NMR spectrum as follows.

1H-NMR (C6D6, 300 MHz): δ 9.15 (d, 2H), 7.72 (d, 2H), 7.42-7.30 (m, 8H), 6.11 (t, 2H), 5.52 (t, 2H), 2.92-2.82 (m, 2H), 2.60 (t, 2H), 2.28-2.16 (m, 1H), 1.92-1.82 (m, 1H).

<Formula B>

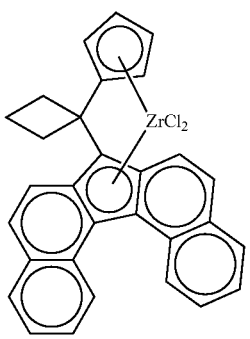

<Preparation Example 3> Preparation of Compound of Formula C

Preparation Example 3-1: Preparation of 2,2-[(cyclopentadienyl)-(7H-dibenzo[c,g]fluorenyl)] propane After a solution in which 6,6-dimethylfulvene (522 mg, 4.92 mmol) was diluted in diethyl ether (5 mL) was slowly added to a solution in which (7H-dibenzo[c,g]fluorene) lithium (893 mg, 3.28 mmol) prepared in Preparation Example 1-4 was dispersed in diethyl ether (35 mL) at −78° C., the temperature was slowly increased to room temperature, and the resulting solution was stirred for 12 hours. After the reaction was terminated, an organic layer was separated by performing extraction with diethyl ether and aqueous $NH_4Cl$. The organic layer was subjected to column chromatography (hexane 100%) to obtain 907 mg (74%) of 2,2-[(cyclopentadienyl)-(7H-dibenzo[c,g]fluorenyl)] propane which is a soft beige solid compound having 1H-NMR spectrum as follows.

1H-NMR (CDCl3, 300 MHz): δ 8.61 (d, 2H), 7.91 (d, 2H), 7.74-7.66 (m, 2H), 7.52-7.46 (m, 4H), 7.41 (d, 1H), 7.32 (d, 1H), 7.00-6.64 (m, 1H), 6.57-6.45 (m, 1H), 6.16-5.87 (m, 1H), 4.33 (d, 1H), 3.24-3.08 (m, 2H), 1.08 (s, 3H), 1.07 (s, 3H).

Preparation Example 3-2: Preparation of isopropylidene [(cyclopentadienyl)-(7H-dibenzo[c,g]fluorenyl)] dilithium After n-BuLi (1.24 mg, 2.93 mmol, 1.6 M in hexane) was slowly added to a solution in which 2,2-[(cyclopentadienyl)-(7H-dibenzo[c,g]fluorenyl)] propane (519 mg, 1.39 mmol) prepared in Preparation Example 3-1 was diluted in diethyl ether (10 mL) at −30° C., the temperature was slowly increased to room temperature, and the resulting solution was stirred for 12 hours. The resulting solid was filtered, and then dried under vacuum to obtain 600 mg (quant., ether adduct) of isopropylidene [(cyclopentadienyl)-(7H-dibenzo[c,g]fluorenyl)] dilithium which is a yellow solid compound.

Preparation Example 3-3: Preparation of isopropylidene [(cyclopentadienyl)-(7H-dibenzo[c,g]fluorenyl)] hafnium Dichloride After a solution in which $HfCl_4$ (472 mg, 1.47 mmol) was diluted in toluene (10 mL) was slowly added to a solution in which isopropylidene [(cyclopentadienyl)-(7H-dibenzo[c,g]fluorenyl)] dilithium (566 mg, 1.47 mmol) prepared in Preparation Example 3-2 was dispersed in toluene (40 mL) at −30° C., the temperature was slowly increased to room temperature, and the resulting solution was stirred for 12 hours. After the reaction was terminated, the resulting product was extracted with toluene and filtered. After the toluene was removed under vacuum, the residue was washed with hexane to obtain 549 mg (60%) of isopropylidene [(cyclopentadienyl)-(7H-dibenzo[c,g]fluorenyl)] hafnium dichloride which is a yellow solid compound having a 1H-NMR spectrum as follows.

1H-NMR (CDCl3, 300 MHz): δ 8.84 (d, 2H), 7.95 (d, 2H), 7.88-7.82 (m, 2H), 7.61-7.54 (m, 4H), 7.49 (d, 2H), 6.30 (t, 2H), 5.88 (t, 2H), 2.48 (s, 6H).

Preparation Example 3-4: Preparation of isopropylidene [(cyclopentadienyl)-(7H-dibenzo[c,g]fluorenyl)] hafnium Dimethyl After a solution in which MeMgBr (468 mg, 1.36 mmol, 3.0 M in diethyl ether) was diluted in toluene (2 mL) was slowly added to a solution in which isopropylidene [(cyclopentadienyl)-(7H-dibenzo[c,g]fluorenyl)] hafnium dichloride (400 mg, 0.65 mmol) prepared in Preparation Example 3-3 was dispersed in toluene (20 mL) at −30° C., the resulting solution was stirred under reflux at 70° C. for 2 hours. After the reaction was terminated, the resulting product was extracted with toluene and filtered. After the toluene was removed under vacuum, the residue was washed with hexane to obtain 241 mg (64%) of isopropylidene [(cyclopentadienyl)-(7H-dibenzo[c,g]fluorenyl)] hafnium dimethyl (a compound of the following Formula C) which is a yellow solid compound having a 1H-NMR spectrum as follows.

1H-NMR (CDCl3, 300 MHz): δ 8.92 (d, 2H), 7.84 (t, 4H), 7.60-7.46 (m, 4H), 7.41 (d, 2H), 6.23 (t, 2H), 5.66 (t, 2H), 2.26 (s, 6H), −1.82 (s, 6H).

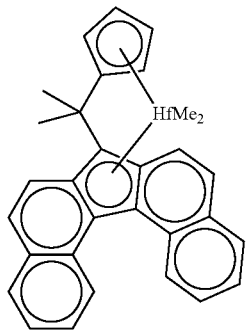

<Formula C>

<Preparation Example 4> Preparation of Compound of Formula D

Preparation Example 4-1: Preparation of isopropylidene [(cyclopentadienyl)-(7H-dibenzo[c,g]fluorenyl)] zirconium Dichloride After a solution in which $ZrCl_4$ (107 mg, 0.46 mmol) was diluted in toluene (5 mL) was slowly added to a solution in which isopropylidene [(cyclopentadienyl)-(7H-dibenzo[c,g] fluorenyl)] dilithium (176 mg, 0.46 mmol) prepared in Preparation Example 3-2 was dispersed in toluene (20 mL) at −30° C., the temperature was slowly increased to room temperature, and the resulting solution was stirred for 12 hours. After the reaction was terminated, the resulting product was extracted with toluene and filtered. After the toluene was removed under vacuum, the residue was washed with hexane to obtain 107 mg (44%) of isopropylidene [(cyclopentadienyl)-(7H-dibenzo[c,g]fluorenyl)] zirconium dichloride (a compound of the following Formula D) which is a reddish brown solid compound having a 1H-NMR spectrum as follows.

1H-NMR (CDCl3, 300 MHz): δ 8.87 (d, 2H), 7.95-7.84 (m, 4H), 7.62-7.50 (m, 6H), 6.37 (t, 2H), 5.94 (t, 2H), 2.48 (s, 6H).

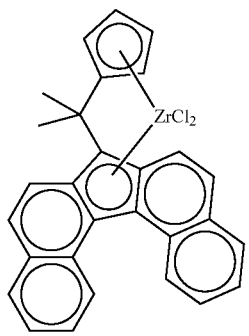

<Formula D>

Polyolefin Polymerization Example (Preparation of Ethylene/1-Octene Copolymer)

<Example 1> Synthesis (1) of Ethylene and 1-Octene Copolymer Using Olefin Polymerization Catalyst Including Compound of Formula A Ethylene and 1-octene were copolymerized as follows using an olefin polymerization catalyst including the compound of Formula A prepared in Preparation Example 1.

First, after a 850-mL reactor was heated to 140° C. to 150° C. using a temperature control jacket, the pressure of the reactor was maintained at 90 bar while continuously supplying a hexane solvent, 1-octene ($C_8$), hydrogen, a scavenger and ethylene ($C_2$). A catalyst and a cocatalyst were each continuously injected directly into the reactor, and dimethylanilinium tetrakis(pentafluorophenyl)borate was used as the cocatalyst and tri-iso-butylaluminium (TiBA) was used as the scavenger.

As the catalyst, an olefin polymerization catalyst including the compound of Formula A prepared in Preparation Example 1 was used, and for the catalyst, a certain amount of compound of Formula A was dissolved in a hexane solvent, the resulting solution was treated with tri-iso-butylaluminium (TiBA), and the treated solution was injected directly into the reactor.

A polymer melted in the reactor passed through a reactor discharge stream and entered a separator, and unreacted ethylene and 1-octene were separated from the hexane solvent, and then dried in a vacuum oven at 80° C. for 12 hours or more to prepare an [ethylene]-[1-octene] polyolefin.

In the preparation process, a polyolefin was prepared by injecting ethylene as an olefin-based monomer and 1-octene as a comonomer thereinto at a flow rate of 8.3 g/min and 8 g/min, respectively, and introducing Formula A of Preparation Example 1 and hydrogen ($H_2$) thereinto at a flow rate of 0.044 g/min and 0.2 g/hr, respectively, and the polyolefin prepared as described above is referred to hereinafter as 'Example 1'.

<Example 2> Synthesis (2) of Ethylene and 1-Octene Copolymer Using Olefin Polymerization Catalyst Including Compound of Formula A A polyolefin was prepared in the same manner as in Example 1, except that 1-octene as a comonomer was injected thereinto at a flow rate of 12 g/min, and the polyolefin prepared as described above is referred to hereinafter as 'Example 2'.

<Comparative Example 1> Synthesis (1) of Ethylene and 1-Hexene Copolymer Using Olefin Polymerization Catalyst Including Compound of Formula E Ethylene and 1-hexene were copolymerized as follows using an olefin polymerization catalyst including a compound of the following Formula E.

<Formula E>

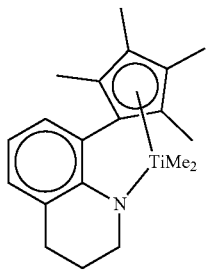

A polyolefin was prepared in the same manner as in Example 1, except that the transition metal compound of Formula E as an olefin polymerization catalyst was injected thereinto at a flow rate of 0.049 g/min, and 1-octene as a comonomer and hydrogen ($H_2$) were injected thereinto at a flow rate of 10 g/min and 0 g/hr, respectively, and the polyolefin prepared as described above is referred to hereinafter as the 'Comparative Example 1'.

<Comparative Example 2> Synthesis (2) of Ethylene and 1-Hexene Copolymer Using Olefin Polymerization Catalyst Including Compound of Formula E A polyolefin was prepared in the same manner as in Comparative Example 1, except that 1-octene as a comonomer was injected thereinto at a flow rate of 12 g/min, and the polyolefin prepared as described above is referred to hereinafter as 'Comparative Example 2'.

<Comparative Example 3> Synthesis (3) of Ethylene and 1-Hexene Copolymer Using Olefin Polymerization Catalyst Including Compound of Formula E A polyolefin was prepared in the same manner as in Comparative Example 1, except that 1-octene as a comonomer and hydrogen ($H_2$) were injected thereinto at a flow rate of 8 g/min and 0.3 g/hr, respectively, and the polyolefin prepared as described above is referred to hereinafter as 'Comparative Example 3'.

<Comparative Example 4> Synthesis (4) of Ethylene and 1-Hexene Copolymer Using Olefin Polymerization Catalyst Including Compound of Formula E A polyolefin was prepared in the same manner as in Comparative Example 3, except that 1-octene as a comonomer was injected thereinto at a flow rate of 12 g/min, and the polyolefin prepared as described above is referred to hereinafter as 'Comparative Example 4'.

Experimental Example

Properties of each of the polyolefins prepared in Examples 1 and 2 and Comparative Examples 1 to 4, and catalytic activities of Formulae A and E were measured, and the results thereof are shown in the following Table 1. In the following Table 1, for each of the respective Examples and Comparative Examples, the density, molecular weight (3D-GPC), and Brookfield viscosity (Brookfield, cP) were measured at room temperature, 160° C., and 177° C., respectively.

TABLE 1

|  | Example 1 | Example 2 | Comparative Example 1 | Comparative Example 2 | Comparative Example 3 | Comparative Example 4 |
| --- | --- | --- | --- | --- | --- | --- |
| Catalyst Type | Formula A | | Formula E | | | |
| Catalyst (g/min) | 0.044 | 0.044 | 0.049 | 0.049 | 0.049 | 0.049 |
| Ethylene (C2, g/min) | 8.3 | 8.3 | 8.3 | 8.3 | 8.3 | 8.3 |
| 1-octene (C8, g/min) | 8 | 12 | 10 | 12 | 8 | 12 |
| C8/C2 (Molar rate) | 0.24 | 0.36 | 0.3 | 0.36 | 0.24 | 0.36 |
| Catalytic activity (kg-PE/g-cat) | 167 | 194 | 124 | 20.2 | 136 | 150 |
| H2 (g/hr) | 0.2 | 0.2 | 0 | 0 | 0.3 | 0.3 |
| Reaction temperature (° C.) | 152 | 151 | 152 | 150 | 149 | 150 |
| Density (g/cc) | 0.880 | 0.863 | 0.863 | 0.868 | 0.875 | 0.858 |
| Mn (3D-GPC) | 8,077 | 6,519 | 71,450 | 100,416 | 25,279 | 30,456 |
| MW (3D-GPC) | 19,451 | 17,491 | 124,282 | 158,924 | 48,761 | 51,868 |
| MWD (3D-GPC) | 2.41 | 2.68 | 1.74 | 1.58 | 1.93 | 1.70 |
| Viscosity (Brookfield, cP at 177° C.) | 9,998 | 5,549 | Cannot be measured | Cannot be measured | 250,000 | 2,950,000 |

As shown in Table 1, it can be seen that in the case of Examples 1 and 2, an olefin polymerization catalyst including the compound of Formula A has high catalytic activity, and a polyolefin polymerized in the presence of the catalyst has low molecular weight and low viscosity characteristics. In contrast, it can be seen that in the case of Comparative Examples 1 to 4, an olefin polymerization catalyst including the compound of Formula E has low catalytic activity, and a polyolefin polymerized in the presence of the catalyst has a high molecular weight.

In particular, when Examples 1 and 2 and Comparative Examples 3 and 4 were compared, polyolefins having a low molecular weight could be prepared even though Examples 1 and 2 had a small amount of hydrogen (H$_2$) introduced. Further, the larger the injected amount of catalyst is, the lower the molecular weight of the polymerized polyolefin tends to be, but it could be seen that in the case of Examples 1 and 2, the prepared polyolefin had a smaller molecular weight than Comparative Examples 1 to 4 even though a smaller amount of catalyst was used compared to Comparative Examples 1 to 4.

That is, the polyolefin according to an exemplary embodiment of the present invention is polymerized in the presence of an olefin polymerization catalyst including a transition metal compound, which has high catalytic activity and is excellent in the adjustment of a molecular weight and copolymerizability, and thus may have low molecular weight and low viscosity characteristics even though relatively small amounts of catalyst and hydrogen are introduced.

As described above, examples belonging to the spirit of the invention have been specifically described with reference to exemplified chemical structural formulae, preparation examples, and the like. However, the spirit of the invention is not limited to the exemplified chemical structural formulae, preparation examples, and the like, and the spirit of the invention can be modified variously based on the exemplified chemical structural formulae, preparation examples, and the like. The exemplified chemical structural formulae, preparation examples, and the like are provided to completely inform a person with ordinary skill in the art to which the invention pertains of the scope of the spirit of the invention, and the scope of the rights of the spirit of the invention is merely defined by the scope of the claims. Therefore, it should be understood that the above-described examples are only illustrative in all aspects and not restrictive.

The invention claimed is:

1. A method for preparing a polyolefin, the method comprising: forming a polyolefin by polymerizing an olefin-based monomer and a comonomer in the presence of an olefin polymerization catalyst comprising a transition metal compound represented by the following Formula 1-2, wherein the polyolefin has a viscosity ranging from 5000 cP to 10000 cP, as measured at 177° C.:

<Formula 1-2>

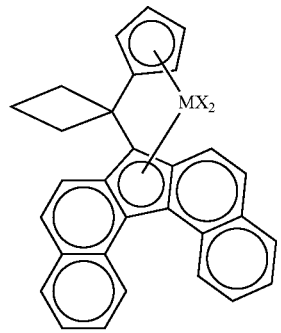

in Formula 1-2,

M is zirconium (Zr) or hafnium (Hf),

X is each independently a halogen or a $C_{1-20}$ alkyl.

2. The method of claim 1, wherein Formula 1 is at least any one of the following Formulae A to B.

<Formula A>

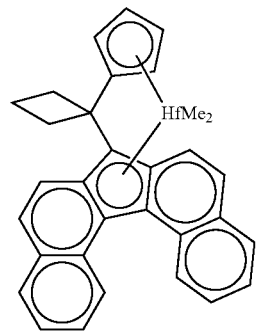

<Formula B>

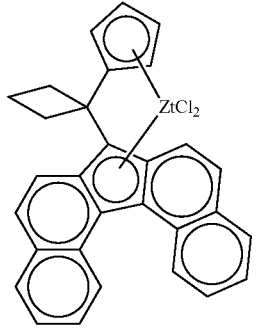

3. The method of claim 2, wherein the olefin polymerization catalyst has a catalytic activity ranging from 160 kg-PE/g-Cat to 200 kg-PE/g-Cat.

4. The method of claim 1, wherein the polyolefin has a weight average molecular weight (Mw) of 20,000 or less.

5. The method of claim 4, wherein the polyolefin has a number average molecular weight (Mn) of 10,000 or less, and a molecular weight distribution (MWD) ranging from 2 to 3, as defined by the following Mathematical Formula 1:

$Mw/Mn$  [Mathematical Formula 1]

6. The method of claim 1, wherein the olefin-based monomer is ethylene, and the comonomer is 1-octene.

7. The method of claim 1, wherein the olefin polymerization catalyst further comprises a cocatalyst compound.

8. The method of claim 7, wherein the cocatalyst compound comprises at least any one of a compound represented by the following Formula I, a compound represented by the following Formula II and a compound represented by Formula III:

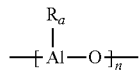

<Formula I> in Formula I, n is an integer of 2 or higher, and
$R_a$ is a halogen atom, a $C_{1-20}$ hydrocarbon group or a $C_{1-20}$ hydrocarbon group substituted with a halogen,

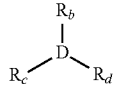

<Formula II> in Formula II, D is aluminum (Al) or boron (B), and
$R_b$, $R_c$ and $R_d$ are each independently a halogen atom, a $C_{1-20}$ hydrocarbon group, a $C_{1-20}$ hydrocarbon group substituted with a halogen group or a $C_{1-20}$ alkoxy group, $[L-H]^+[Z(A)_4]^-$ or $[L]^+[Z(A)_4]^-$   <Formula III> in Formula III, L is a neutral or cationic Lewis base,
$[L-H]^+$ and $[L]^+$ are Brönsted acids,
Z is a Group 13 element, and
A is each independently a substituted or unsubstituted $C_{6-20}$ aryl group or a substituted or unsubstituted $C_{1-20}$ alkyl group.

* * * * *